United States Patent Office 3,525,721
Patented Aug. 25, 1970

3,525,721
COPOLYMERS OF ALKOXY ALKYL ACRYLATES, ALKYL ACRYLATES AND GLYCIDYL ACRYLATE
August H. Jorgensen, Jr., Avon Lake, Ohio, assignor to The B. F. Goodrich Company, New York, N.Y., a corporation of New York
No Drawing. Filed Nov. 14, 1967, Ser. No. 683,014
Int. Cl. C08f 15/40
U.S. Cl. 260—80.72   9 Claims

ABSTRACT OF THE DISCLOSURE

Vulcanizable acrylic elastomers having an improved balance of low temperature flexibility and oil resistance are prepared by polymerizing together an alkyl acrylate, an alkoxy alkyl acrylate and a small amount of glycidyl acrylate or methacrylate. Typical examples of such copolymers are those containing about 20 to 60 percent methoxy or ethoxy ethyl acrylate, about 80 to 40 percent ethyl or n-butyl acrylate and less than 5 percent of a glycidyl acrylate. These acrylic copolymers may be vulcanized with a variety of curing systems for example, a fatty acid soap and dipentamethylene thiuram hexasulfide, soap and sulfur, zinc dimethyl dithiocarbamate, hexamethylene diamine, ammonium stearate, and the like.

BACKGROUND OF THE INVENTION

The desirable physical characteristics of acrylic elastomers are well known. Much effort has been made to provide acrylic elastomers which are more readily vulcanizable and/or are more amenable to vulcanization with a greater variety of materials so that a more versatile polymer for a variety of applications is available. In addition, it is desired to improve certain characteristics of acrylic elastomers such as oil resistance. Resistance to oil can be obtained through use of nitrile containing monomers such as acrylonitrile. However, introduction of amounts of acrylonitrile sufficient to improve oil resistance normally is at the cost of decreased low temperature flexibility.

SUMMARY OF THE INVENTION

Acrylate elastomers having an improved balance of low temperature flexibility and oil resistance which also are readily vulcanized by a variety of vulcanizing agents are obtained by polymerizing together about 20 to 60% of certain alkoxy alkyl acrylates, about 80 to 40% of alkyl acrylates and less than 5% of glycidyl acrylate or methacrylate.

DETAILED DESCRIPTION

The alkyl acrylates employed are those wherein the alkyl group contains 1 to 8 carbon atoms. More preferably, of the alkyl acrylates used, a major proportion will be alkyl acrylates wherein the alkyl group contains 1 to 4 carbon atoms. For example, ethyl acrylate and/or n-butyl acrylate. The equivalent cyanoacrylates also may be employed. In place of part of the alkyl acrylates, isooctyl acrylate and the like may be used. The amount of alkyl acrylate charged and in the interpolymers will vary from about 80 to about 40 weight percent of the polymers total, and more preferably from about 50 to about 70 weight percent.

Useful alkoxy alkyl acrylates may be represented by the structure

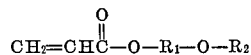

wherein $R_1$ is an alkylene radical containing 1 to 4 carbon atoms and $R_2$ is an alkyl radical containing 1 to 4 carbon atoms. Particularly useful are alkoxy alkyl acrylates wherein $R_1$ is —$CH_2$—$CH_2$— and $R_2$ is methyl or ethyl. Typical alkoxy alkyl acrylates include methoxy ethyl acrylate, methoxy methyl acrylate, ethoxy ethyl acrylate, butoxy ethyl acrylate, methoxy ethoxy ethyl acrylate, and the like. An optimum balance of low temperature properties and oil resistance has been obtained with the methoxy and ethoxy ethyl acrylates. The amount of alkoxy alkyl acrylate employed preferably is at least 20 weight percent of the polymer, but may be as high as 60 weight percent. More preferably, the amount employed will be from about 30 to about 50 weight percent, both in the monomer mixture and the resulting interpolymers.

The amount of glycidyl acrylate or glycidyl methacrylate employed will be from greater than 0.1 percent based on the total monomers to less than 5 percent. From 0.5 to about 3 percent has resulted in useful properties while a range from 1 to 2 percent results in interpolymers that are readily cured or vulcanized with a variety of vulcanization agents and have an excellent balance of desired physical properties for elastomer applications. The third essential monomer is glycidyl acrylate and/or methacrylate. When used herein and in the claims the term glycidyl acrylate is meant to include both acrylate and methacrylate.

Other vinylidene monomers having a terminal

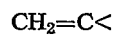

group may be employed with the three essential monomers so long as the desirable balance of low temperature flexibility and oil resistance is not substantially affected. Normally less than 10% other vinylidene monomers may be used as vinylidene chloride, vinyl chloride, methacrylonitrile, vinyl ethers, octyl methacrylate and the like.

The interpolymers are readily prepared by methods employed by those skilled in the art in providing acrylic elastomers. While such polymerizations may be conducted in bulk or in solution, the preferred method is to polymerize the monomers in water in an aqueous dispersion. The polymerizations may be conducted in batch reactions or the monomers may be proportioned to a reactor containing water and other desired polymerization additives. The polymerizations may be conducted over a wide temperature range as from —10° C. to 95° C. Better results are generally obtained at temperatures in the range of about 5° C. to about 50° C. in the presence of water containing a free radical catalyst and surface active agents.

The catalysts employed may be any of those free radical forming catalysts known to those skilled in the art including both organic and inorganic peroxide, inorganic persulfates, organic hydroperoxides, azo compounds, and the well known redox catalyst systems. Other additives to the water will include acids or bases to adjust the pH of the aqueous dispersion which usually is in the range of about 4 to 8; buffers, inorganic salts and surface active agents. Since the alkyl acrylates are soluble in water only minimum amounts of surface active agents are normally required to form polymers. Larger amounts normally will be employed when stable latices are desired. Such surface active agents may include anionic, cationic and nonionic materials. Typical surface action agents found useful in preparing the interpolymers include sodium alkyl sulfates as sodium lauryl sulfates, sodium alkyl aryl sulfonates, sodium naphthalene sulfonate, quaternary salts, polyglycol fatty acid esters and the like. As is obvious, the catalysts, surface active agents, and other polymerization conditions are not critical to obtaining the improved interpolymers of this invention. If the interpolymers are prepared in the form of latices and not used as such, the elastomers are normally isolated from the latex by coagulation with salt-acid, polyvalent metal salts, alcohol and the like, and the resulting solid interpolymer washed with water and dried. The examples represent only one method for preparing the acrylic elastomers.

The resulting dried elastomers may have added thereto stabilizers which are effective as antioxidants and antiozonants, and in many cases improved heat resistance of the elastomers is obtained by use of such stabilizers. Both inorganic and organic phosphites are effective heat stabilizers for the elastomers of this invention. Use of both a phosphite and other antioxidants as the phenol derivatives are suggested.

The polymers are compounded in accordance with methods known to those skilled in the art either on a mill or internal mixer. There may be added to the polymers the usual compounding ingredients including pigments and fillers such as carbon black, clay, titanium oxide and the like; additional stabilizers, lubricants, coloring agents if desired, and vulcanizing ingredients of which there are a great variety.

Examples of the vulcanization systems which can be used with these acrylic elastomers are fatty acid soaps and dipentamethylene thiuram hexasulfide, fatty acid soap and sulfur, hexamethylene diamine, triethylene diamine, ammonium benzoate, ammonium stearate, zinc dimethyl dithiocarbamate, sulfur and phenylene diamine, dicyandimide with azelaic acid and the like.

EXAMPLE I

An acrylic elastomer was prepared according to the following polymerization recipe.

| Material: | Parts |
|---|---|
| Water | 300.0 |
| Emulsifier[1] | 2.0 |
| NaOH | 0.071 |
| $Na_2SO_4$ | 0.3 |
| $Na_2S_2O_4$ | 0.2 |
| Versene 100[2] | 0.024 |
| Sequestrene NaFe[3] | 0.005 |
| Sodium formaldehyde sulfoxylate | 0.04 |
| p-Menthane hydroperoxide | 0.04 |
| Ethyl acrylate | 50.0 |
| Ethoxy ethyl acrylate | 48.5 |
| Glycidyl acrylate | 1.5 |

[1] Sodium nonyl phenyl poly(ethylene oxide) phosphate (diester).
[2] Tetrasodium ethylenediamine tetraacetate.
[3] NaFe salt of ethylene diamine tetraacetic acid.

The ingredients were charged to the reactor in the order shown except the sulfoxylate and hydroperoxide, the reactor cooled to 5° C., then the catalyst and activator were added. After a 15 minute induction period the temperature rose to 31° C. and the conversion of monomers to polymers was 78% after 30 minutes. The pH of the resulting latex was 4.5. This reaction was repeated with the exception that only 100 parts of water were used, the sequestrene NaFe was increased to 0.01, and the monomers proportioned over a six hour period. Both of these polymers were then compounded in the following recipe.

| Material | Batch | Proportion |
|---|---|---|
| Elastomer | 100 | 100 |
| Stearic acid | 1.0 | 1.0 |
| Potassium stearate | 4 | 4 |
| FEF carbon black | 55 | 55 |
| Triisooctyl phosphite | 2.0 | 2.0 |
| Dipentamethylene thiuram hexasulfide | 0.5 | 0.5 |

Samples of these compounds were cured at 3380 F. for 4 and 8 minutes. The stress strain properties, Durometer A hardness, ASTM D-746 brittle point and percent volume swell after 70 hours at 302° F. in No. 3 oil are reported.

| | | |
|---|---|---|
| 100% Modulus, p.s.i.: | | |
| 4′ | 210 | 210 |
| 8′ | 290 | 430 |
| Tensile, p.s.i.: | | |
| 4′ | 1,340 | 880 |
| 8′ | 1,620 | 1,470 |
| Elongation, percent: | | |
| 4′ | 350 | 350 |
| 8′ | 340 | 260 |
| "A" Hardness: | | |
| 4′ | 55 | 61 |
| 8′ | 57 | 64 |
| Brittle point, °F | −17.5 | −17.5 |
| Percent volume swell | +15.5 | +14.7 |

EXAMPLE II

To demonstrate the versatility of the elastomers of this invention in different vulcanization systems, a series of compounds were prepared as follows:

| Materials | I | II | III | IV | V |
|---|---|---|---|---|---|
| Polymer of Example I | 100 | 100 | 100 | 100 | 100 |
| Stearic acid | 1.0 | 1.0 | 1.0 | 1.0 | 1.0 |
| Potassium stearate | | | | 4 | 4 |
| FEF carbon black | 55 | 55 | 55 | 55 | 55 |
| Poly(alkylaryl)phosphite [1] | 2 | 2 | 2 | 2 | 2 |
| Zinc dimethyl dithiocarbamate | 2 | | | | |
| Ammonium stearate | | | 6 | | |
| Dipentamethylene thiuram hexasulfide | | 0.5 | | | |
| Hexamethylene diamine carbamate | | | | 0.5 | |
| Sulfur | | | | | 0.5 |

[1] Reaction product of dichloro-p-octyl phenyl phosphite and di-(t-butyl) bisphenol A.

The compounds were vulcanized at 338° F. for 8 minutes and the stress-strain properties, Durometer A hardness and percent volume swell after 70 hours at 302° F. and ASTM No. 3 oil, are set forth below.

| | I | II | III | IV | V |
|---|---|---|---|---|---|
| 100% modulus, p.s.i. | 400 | 260 | 370 | 600 | 630 |
| Tensile, p.s.i. | 1,360 | 1,140 | 1,330 | 1,600 | 1,260 |
| Elongation, percent | 290 | 330 | 270 | 210 | 180 |
| "A" hardness | 60 | 58 | 64 | 64 | 67 |
| Percent volume swell | 14.6 | 14.3 | 14.8 | 14.7 | 16.0 |
| Brittle point, °F | −9.5 | −19.5 | −16.0 | −23.0 | −17.0 |

The balance of low temperature flexibility and oil resistance for this acrylic elastomer is much better than that of a copolymer of ethyl acrylate and glycidyl acrylate or polyethyl acrylate; and even better than copolymers of 90 n-butyl acrylate and 10 acrylonitrile which are specifically designed to improve low temperature flexibility of acrylate polymers. For example, the ASTM brittle point of a copolymer of about 98.5% ethyl acrylate and about 1.5% glycidyl acrylate vulcanized with dipentamethylene thiuram hexasulfide is +11 F. For a copolymer of 89 n-butyl acrylate and 11 acrylonitrile vulcanized with triethylene tetramine and sulfur, while the brittle point is below 0° the percent volume swell is about 45%.

EXAMPLE III

Acrylic elastomer interpolymers containing ethyl acrylate and n-butoxy ethyl acrylate and a lesser amount of ethoxy ethyl acrylate were prepared following the procedure of Example I. The monomer proportions are set forth in the data table below along with the compound recipe and physical properties of vulcanizates of the elastomers.

| Monomers | I | II |
|---|---|---|
| Ethyl acrylate | 76.5 | 50 |
| Ethoxyethyl acrylate | 22.0 | |
| n-Butoxy ethyl acrylate | | 48.5 |
| Glycidyl acrylate | 1.5 | 1.5 |
| Compound recipe in parts: | | |
| Elastomer | 100 | 100 |
| Stearic acid | 1.0 | 1.0 |
| Potassium stearate | 4 | 4 |
| FEF carbon black | 55 | 55 |
| Triisooctyl phosphite | 2 | |
| Dipentamethylene thiuram hexasulfide | 0.5 | 0.5 |

The compounds were cured at 338° F. for 8 minutes and the stress-strain properties, Durometer A hardness, ASTM D-746 brittle point and percent volume swell after 70 hours at 302° F. in ASTM No. 3 oil are reported.

| | | |
|---|---|---|
| 100% modulus, p.s.i. | 350 | 1,180 |
| Tensile, p.s.i. | 1,910 | 1,180 |
| Elongation, percent | 350 | 100 |
| "A" hardness | 60 | 75 |
| Percent volume swell | 15.4 | 23.3 |
| Brittle point, °F | −6 | −8 |

EXAMPLE IV

Another series of acrylic elastomers were prepared with n-butyl acrylate, ethyl acrylate, ethoxyethyl acrylate, methoxyethyl acrylate and glycidyl acrylate by the procedure of Example I in the following monomer proportions.

| | I | II | III |
|---|---|---|---|
| n-Butyl acrylate | | 40 | 50 |
| Ethyl acrylate | 50 | | |
| Ethoxyethyl acrylate | 48.5 | | 48.5 |
| Methoxyethyl acrylate | | 58.5 | |
| Glycidyl ethyl acrylate | 1.5 | 1.5 | 1.5 |
| Compound recipe: | | | |
| Elastomer | 100 | 100 | 100 |
| Stearic acid | 1 | 1 | 1 |
| Potassium stearate | 4 | 4 | 4 |
| Zinc oxide | 4 | 4 | 4 |
| Poly(alkylaryl)phosphite [1] | 2 | 2 | 2 |
| FEF carbon black | 55 | 55 | 55 |
| Dipentamethylene thiuram hexasulfide | 1 | 1 | 1 |
| NBC [2] | 2 | 2 | 2 |

[1] Reaction product of dichloro-p-octyl phenyl phosphite and di-(t-tubyl) bisphenol A.
[2] Nickel dibutyl dithiocarbamate.

The compounds were vulcanized at 338° F. for 8 minutes. The stress-strain properties, Durometer A hardness, ASTM D-746 brittle point and percent volume swell after 70 hours at 302° F. in ASTM No. 3 oil are recorded.

| | | | |
|---|---|---|---|
| 100% modulus, p.s.i. | 520 | 870 | 800 |
| Tensile, p.s.i. | 1,350 | 1,390 | 1,390 |
| Elongation, percent | 250 | 150 | 160 |
| "A" hardness | 66 | 64 | 63 |
| Percent volume swell | 13.1 | 14.9 | 20.4 |
| ASTM D-746 brittle point, °F | −8.5 | −35.5 | −33 |

These vulcanizable acrylic elastomers are useful in applications where acrylic elastomers have been used in the past and find further uses not generally available to many acrylic elastomers because of a less desirable balance of low temperature flexibility and oil resistance. For example, in molded parts subject to attack by both heat and oils but where resistance to low temperature brittleness is required as in gaskets, cups, seals and the like.

I claim:
1. Vulcanizable acrylic elastomer copolymers comprising about 20 to 60% of an alkoxyalkyl acrylate, about 80 to 40% of ethyl acrylate and less than 5% of a glycidyl acrylate wherein the alkyl group of the alkoxyalkyl acrylate contains 1 to 4 carbon atoms.
2. The elastomer of claim 1 wherein the percent glycidyl acrylate is between about 0.5 and 3.
3. The elastomer of claim 2 wherein the alkyl group of the alkoxyalkyl acrylate contains 1 to 2 carbon atoms and the percent of glycidyl acrylate is between 1 and 2.
4. The elastomer of claim 3 wherein the ethyl acrylate is present in amount from about 70 to 50%, the alkoxyalkyl acrylate is selected from the group consisting of methoxyethyl acrylate and ethoxyethyl acrylate present in amount from about 30 to 50%, and glycidyl acrylate is present in amount from about 1.25 to 1.75%.
5. The elastomer of claim 3 wherein the ethyl acrylate is present in amount from about 70 to 50%, the alkoxyalkyl acrylate is selected from the group consisting of methoxyethyl acrylate and ethoxyethyl acrylate present in amount from about 30 to 50%, and glycidyl methacrylate is present in amount from about 1.25 to 1.75%.
6. An elastomer of claim 1 in a vulcanized state.
7. The elastomer of claim 3 in a vulcanized state.
8. An elastomer of claim 4 in a vulcanized state.
9. An elastomer of claim 5 in a vulcanized state.

References Cited

UNITED STATES PATENTS

| | | | |
|---|---|---|---|
| 3,326,868 | 6/1967 | Tucker | 260—80.5 |
| 3,344,098 | 9/1967 | Horiguchi et al. | 260—22 |
| 3,350,339 | 10/1967 | Sekmakas | 260—29.6 |
| 3,450,681 | 6/1969 | Gobran et al. | 260—80.72 |

JOSEPH L. SCHOFER, Primary Examiner

S. M. LEVIN, Assistant Examiner

U.S. Cl. X.R.
260—41